US007324790B2

United States Patent
Hyunh et al.

(10) Patent No.: US 7,324,790 B2
(45) Date of Patent: Jan. 29, 2008

(54) WIRELESS TRANSCEIVER AND METHOD OF OPERATING THE SAME

(75) Inventors: Phuong T. Hyunh, Annandale, VA (US); John W. McCorkle, Vienna, VA (US); Fernando N. Hidalgo, Ashburn, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 338 days.

(21) Appl. No.: 10/834,024

(22) Filed: Apr. 29, 2004

(65) Prior Publication Data

US 2005/0245210 A1    Nov. 3, 2005

(51) Int. Cl.
*H04B 1/44* (2006.01)
*H04B 1/46* (2006.01)

(52) U.S. Cl. .............................. 455/78; 455/79; 455/82; 455/83

(58) Field of Classification Search ................. 455/78, 455/82, 83, 107, 248.1, 79, 320, 330, 144, 455/311, 341
See application file for complete search history.

(56) References Cited

U.S. PATENT DOCUMENTS 5,457,814 A * 10/1995 Myrskog et al. ............ 455/571
6,469,582 B2 * 10/2002 Forbes ........................ 330/303
6,510,309 B1 * 1/2003 Thompson et al. ........... 455/78

* cited by examiner

*Primary Examiner*—Matthew Anderson
*Assistant Examiner*—Eugene Yun (57) ABSTRACT

A transceiver 400 is provided in an ultrawide bandwidth device, which includes an antenna 110, a transmitter circuit 145, and a receiver circuit 165. A transmitter amplifier 440 is provided between the antenna 110 and the transmitter circuit 145, and is configured to have an operational transmitter output impedance when the transceiver 400 is in a transmit mode and an isolation transmitter output impedance when the transceiver 400 is in a receive mode. A receiver amplifier 460 is provided between the antenna 110 and the receiver circuit 165, and is configured to have an operational receiver input impedance when the transceiver 400 is in a receive mode and an isolation receiver input impedance when the transceiver 400 is in a transmit mode. The isolation transmitter output impedance is greater than the operational receiver input impedance, and the isolation receiver input impedance is greater than the operational transmitter output impedance. Thus, a transmitter and receiver can be isolated without using a transmit/receive switch.

15 Claims, 3 Drawing Sheets

WIRELESS TRANSCEIVER AND METHOD OF OPERATING THE SAME

FIELD OF THE INVENTION

The present invention relates in general to wireless communication systems, such as ultrawide bandwidth (UWB) systems, including mobile transceivers, centralized transceivers, and related equipment, and corresponding methods. Another aspect of the present invention relates to a wireless transceiver that can switch between a transmitter portion and a receiver portion without the use of a transmit/receive switch. Another aspect of the present invention relates to a low noise amplifier for use with a receiver portion of a transceiver.

BACKGROUND OF THE INVENTION

Wireless transceiver devices operate as both transmitters and receivers, either in a simplex mode where the transmitter and receiver never operate at the same time, or in duplex mode where signals may be received and transmitted simultaneously. In some transceiver implementations the transmitter and receiver portions are totally separate circuits, each including all of the circuit elements required for operation. But this can cause significant increases in size, weight, and power consumption.

As a result, many transceiver designs share various circuit elements between the transmitter portion and the receiver portion. In particular, in simplex transceivers, the antenna is often shared. This can provide significant advantages for the transceiver in cost and size.

However, when a single antenna is used for both transmitting and receiving signals, it is necessary to provide some means for making certain that a receiver portion of the transceiver and a transmitter portion of the transceiver are properly isolated from each other while one is performing its function. Otherwise, interference from the inactive portion might disrupt the operation of the active portion.

Accordingly, it would be desirable to better facilitate switching operations between transmitter and receiver portions of a wireless transceiver using a shared antenna.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

In order to minimize weight, cost, and power consumption, it is often desirable to share an antenna between a transmitter portion and a receiver portion of a transceiver. However, in order to maximize the ability to send and receive signals accurately, it is also desirable to provide a way to isolate the transmitter portion from the antenna when the receiver portion is receiving a signal, and to isolate the receiver portion from the antenna when the transmitter portion is sending a signal.

First Transceiver

Figure 1:
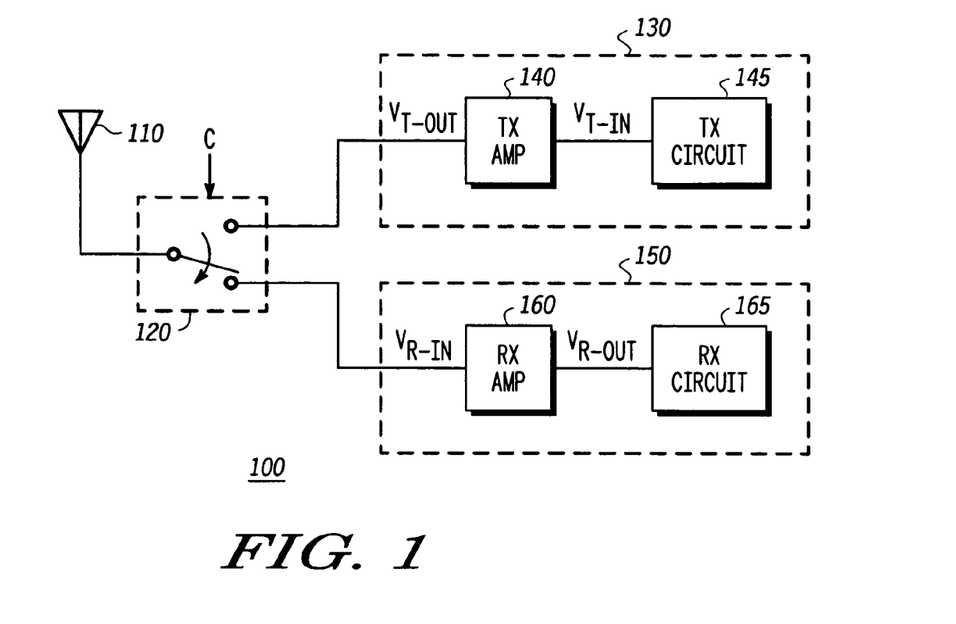
FIG. 1 is a diagram showing an embodiment of a transceiver device employing a transmit/receive switch.

FIG. 1 is a diagram showing an embodiment of a transceiver device employing a transmit/receive switch. As shown in FIG. 1, the transceiver device 100 includes an antenna 110, a transmit/receive (T/R) switch 120, a transmitter portion 130, and a receiver portion 150. The transmitter portion 130 further includes a transmitter amplifier 140 and a transmitter circuit 145; and the receiver portion 150 further includes a receiver amplifier 160 and a receiver circuit 165.

The antenna 110 can be used to both transmit signals and receive signals. It can be any appropriate antenna that can serve this dual function. In the embodiment shown in FIGS. 1 to 3, a UWB antenna is used, such as the one disclosed in U.S. Pat. No. 6,590,545 to McCorkle, entitled "Electrically Small Planar UWB Antenna Apparatus and System Thereof." However, alternate embodiments can use different antenna designs.

The T/R switch 120 allows a single antenna 110 to be used by both the transmitter portion 130 and the receiver portion 150 of the transceiver device 100. When operating in a transmit mode, the T/R switch 120 connects the transmitter portion 130 to the antenna 120, and isolates the receiver portion 150 from the antenna 110. Then, when operating in a receive mode, the T/R switch 120 isolates the transmitter portion 130 from the antenna 110, and connects the receiver portion 150 to the antenna 110. In this way, no signals from the transmitter portion 130 can interfere with the antenna 110 when the transceiver 100 is in a receive mode, and no signals from the receiver portion 150 can interfere with the antenna 110 when the transceiver 100 is in a transmit mode. Each portion 130, 150 will be isolated by a short circuit at the T/R switch 120 when the other portion 130, 150 is active.

In the embodiment of FIG. 1, the T/R switch 120 will be controlled by a mode control signal C, which has a high value during a receive mode and a low value in a transmit mode. When the mode control signal C indicates that the transceiver 100 is in a receive mode (i.e., it is high in the embodiment of FIGS. 1 to 3), the T/R switch 120 will connect the receiver portion 150 to the antenna 110 and will isolate the transmitter portion 130 from the antenna through an open circuit. When the mode control signal C indicates that the transceiver 100 is in a transmit mode (i.e., it is low in the embodiment of FIGS. 1 to 3), the T/R switch 120 will connect the transmitter portion 130 to the antenna 110 and will isolate the receiver portion 150 from the antenna 110 through an open circuit.

Alternate embodiments could modify the mode control signal C. For example, an alternate mode control signal could be low to indicate a receive mode and high to indicate a transmit mode.

The transmitter portion 130 in the disclosed embodiment includes all of the circuitry necessary to transmit signals according to a desired format. Its particular design can vary in different transceiver designs, as would be understood by one skilled in the art of transmitters. In the disclosed embodiment, the transmitter portion 130 is a UWB transmitter, though other transmitter designs can be used in alternate embodiments, e.g., wide band or narrow band transmitters. As noted above, the transmitter portion 130 in the embodiment of FIG. 1 includes a transmitter amplifier 140 connected to the output of a transmitter circuit 145.

Similarly, the embodiment of the receiver portion 150 shown in FIG. 1 includes all of the circuitry necessary to receive signals according to a desired format. Its particular design can vary in different transceiver designs, as would be understood by one skilled in the art of receivers. In the disclosed embodiment, the receiver portion 150 is a UWB receiver, though other receiver designs can be used in alternate embodiments, e.g., wide band or narrow band transmitters. As noted above, the receiver portion 150 in the embodiment of FIG. 1 includes a receiver amplifier 160 connected to the output of a receiver circuit 165. The receiver amplifier 160 is may be a low noise amplifier (LNA).

Furthermore, although the transmitter portion 130 and the receiver portion 150 in FIG. 1 are shown as being directly connected to the antenna 110, other circuitry could be placed between the transmitter portion 130 or the receiver portion 150 and the antenna 110, e.g., a filter, as would be understood by those skilled in the art of transceivers.

First Transmitter Amplifier

Figure 2:
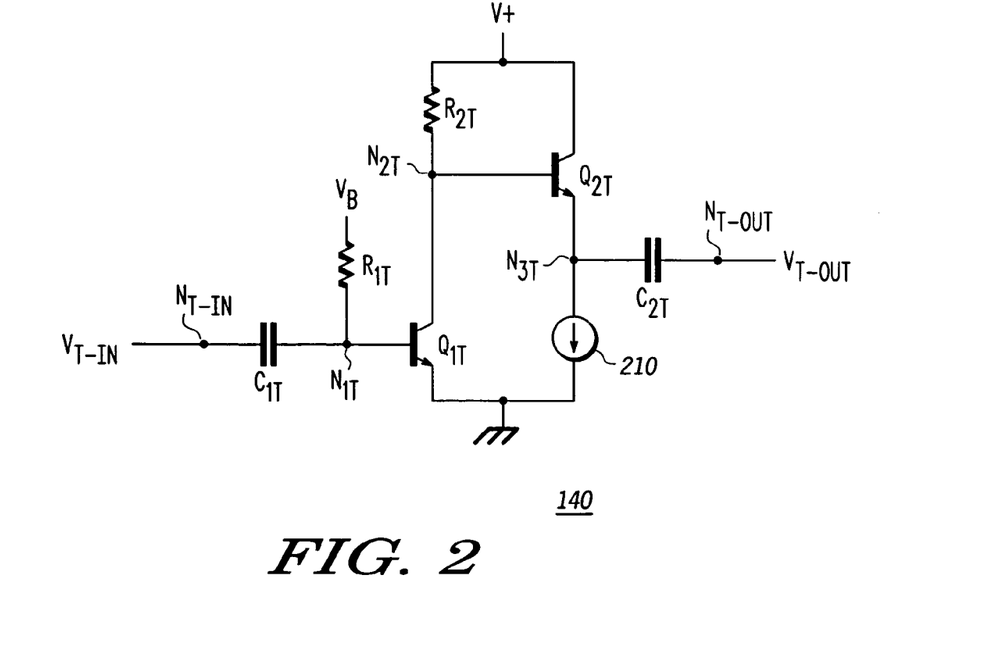
FIG. 2 is a circuit diagram of a transmitter amplifier from the transmitter portion of FIG. 1.

FIG. 2 is a circuit diagram of a transmitter amplifier 140 from the transmitter portion 130 of FIG. 1. As shown in FIG. 2, the transmitter amplifier 140 includes a first transmitter transistor $Q_{1T}$, a second transmitter transistor $Q_{2T}$, a first transmitter capacitor $C_{1T}$, a second transmitter capacitor $C_{2T}$, a first transmitter resistor $R_1T$, a second transmitter resistor $R_{2T}$, and a transmitter current source 210.

The first transmitter transistor $Q_{1T}$ has its base connected to a first transmitter node $N_{1T}$, its collector connected to a second transmitter node $N_{2T}$, and its emitter connected to ground. The first transmitter transistor $Q_{1T}$ is configured to operate as a driver amplifier in the transmitter amplifier 140.

The second transmitter transistor $Q_{2T}$ has its base connected to the second transmitter node $N_{2T}$, its collector connected to a reference voltage $V^+$, and its emitter connected to a third transmitter node $N_{3T}$. The second transmitter transistor $Q_{2T}$ is configured to operate as a driver in the transmitter amplifier 140. In the embodiment shown in FIG. 2, the embodiment shown in FIG. 2, the reference voltage $V^+$ is about 3.3 volts.

The first transmitter capacitor $C_{1T}$ is connected between a transmitter input node $N_{T-IN}$ and the first transmitter node $N_{1T}$. It is configured to operate as an AC coupling capacitor, and serves to block any incoming DC voltages from the transmitter input node $N_{T-IN}$ so that all biases for the transmitter amplifier 140 are local biases. In the embodiment shown in FIG. 2, the first transmitter capacitor $C_{1T}$ has a value of about 500 fF.

The second transmitter capacitor $C_{2T}$ is connected between the third transmitter node $N_{3T}$ and the transmitter output node $N_{T-OUT}$. It is configured to operate as an AC coupling capacitor, and serves to block any incoming DC voltages from the transmitter output node $N_{T-OUT}$ so that all biases for the transmitter amplifier 140 are local biases. In the embodiment shown in FIG. 2, the second transmitter capacitor $C_{2T}$ has a value of about 6 pF.

In alternate embodiments, the first and second transmitter capacitors $C_{1T}$ and $C_{2T}$ could be replaced with different circuit elements to isolate the bias voltages in the transmitter amplifier 140.

The first transmitter resistor $R_{1T}$ is connected between a bias voltage $V_B$ and the first transmitter node $N_{1T}$, and is configured to provide the bias voltage $V_B$ to the base of the first transmitter transistor $Q_{1T}$. This bias voltage $V_B$ in the embodiment of FIG. 2 is set to cause the first transmitter transistor $Q_{1T}$ to operate as desired to cause the transmitter amplifier 140 to perform its amplification function, as would be understood by one skilled in the art of amplifiers. In the embodiment shown in FIG. 2, the bias voltage $V_B$ is about 0.8 volts and the first transmitter resistor $R_{1T}$ has a value of about 1 kΩ.

The second transmitter resistor $R_{2T}$ is connected between a reference voltage $V^+$ and the second transmitter node $N_{2T}$, and has its value set to determine the gain of the transmitter amplifier 140. In the embodiment shown in FIG. 2, the second transmitter resistor $R_{2T}$ has a value of about 250 Ω.

The transmitter current source 210 is connected between the third transmitter node $N_{3T}$ and ground, and is configured in the embodiment of FIG. 2 to provide a constant current across the second transmitter transistor $Q_{2T}$. In the embodiment shown in FIG. 2, the transmitter current source 210 provides a current of about 20 mA.

In the embodiment of FIG. 2, the parameters of the circuitry in the transmitter amplifier 140 are chosen to provide a desired low transmitter output impedance, e.g., 3 Ω.

In operation, a transmitter input voltage $V_{T-IN}$ is provided at the transmitter input node $N_{T-IN}$. This transmitter input voltage $V_{T-IN}$ is then amplified by the transmitter amplifier 140 according to generally understood amplifier principles to produce the transmitter output voltage $V_{T-OUT}$, which is provided at the transmitter output node $N_{T-OUT}$.

Although the exemplary transmitter amplifier 140 shown in FIG. 2 uses a bipolar junction transistor as the first transmitter transistor $Q_{1T}$, and is set up in a common-emitter configuration, alternate embodiments could use other types of transistors for the amplifier circuit, e.g., a CMOS transistor.

In alternate embodiments, the transmitter amplifier 140 can be designed as a differential amplifier. In this case, a positive and negative input voltage could be received, and positive and negative output voltages provided. In this alternate embodiment, the circuit design could be a differential version of the amplifier shown in FIG. 2, as would be understood by one skilled in the art of amplifier design.

Although one embodiment is described above with reference to FIG. 2, and specific values are given for circuit elements, these are provided by way of example only and should not be considered in any way limiting. Alternate embodiments can modify the values of these elements as desired to alter the operation of the transmitter amplifier 140.

First Receiver Amplifier

Figure 3:
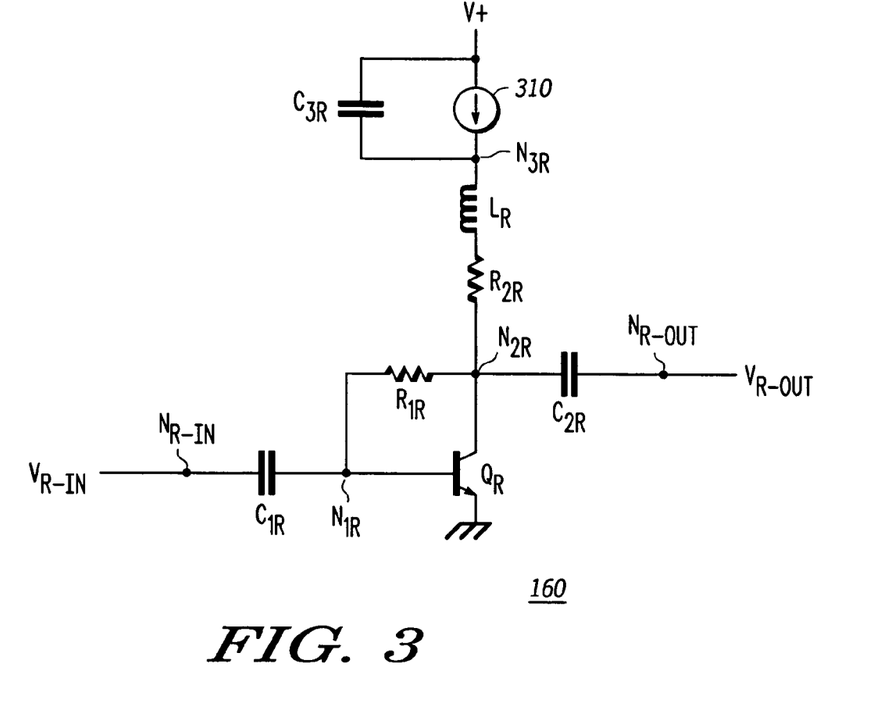
FIG. 3 is a circuit diagram of a receiver amplifier from the receiver portion of FIG. 1.

FIG. 3 is a circuit diagram of a receiver amplifier 160 from the receiver portion of FIG. 1. As shown in FIG. 3, the receiver amplifier 160 includes a receiver current source 310, a receiver transistor $Q_R$, a first receiver capacitor $C_{1R}$, a second receiver capacitor $C_{2R}$, a third receiver capacitor $C_{3R}$, a first receiver resistor $R_{1R}$, a second receiver resistor $R_{2R}$, and a receiver inductor $L_R$.

The receiver transistor $Q_R$ has its base connected to a first receiver node $N_{1R}$, its collector connected to a second receiver node $N_{2R}$, and its emitter connected to ground.

The first receiver capacitor $C_{1R}$ is connected between a receiver input node $N_{R-IN}$ and the first receiver node $N_{1R}$, and serves to block any incoming DC voltages from the receiver input node $N_{R-IN}$, so that all biases for the receiver transistor $Q_R$ are local biases. In the embodiment shown in FIG. 3, the first receiver capacitor $C_{1R}$ has a value of about 6 pF.

The second receiver capacitor $C_{2R}$ is connected between a receiver output node $N_{R-OUT}$ and the second receiver node $N_{2R}$, and serves to block any incoming DC voltages from the receiver output node $N_{R-OUT}$, so that all biases for the receiver transistor $Q_R$ are local biases. In the embodiment shown in FIG. 3, the second receiver capacitor $C_{2R}$ has a value of about 6 pF.

In alternate embodiments, the first and second receiver capacitors $C_{1R}$ and $C_{2R}$ could be replaced with different circuit elements to isolate the bias voltages in the receiver amplifier 160.

The first receiver resistor $R_{1R}$ is connected between the first receiver node $N_{1R}$ and the second receiver node $N_{2R}$, and is configured to provide a feedback signal to bias the base of the receiver transistor $Q_R$. In the embodiment shown in FIG. 3, the first receiver resistor $R_{1R}$ has a value of about 800 Ω.

The receiver current source 310 is connected between a reference voltage $V^+$ and a third receiver node $N_{3R}$. It is configured to provide a reference current for the receiver transistor $Q_R$. In the embodiment shown in FIG. 3, the reference voltage $V^+$ is about 3.3 volts and the receiver current source 310 provides a current of about 12 mA.

The third receiver capacitor $C_{3R}$ is connected between the reference voltage $V^+$ and the third receiver node $N_{3R}$, in parallel with the receiver current source 310. It is configured to separate the reference voltage $V^+$ from the third receiver node $N_{3R}$, which forms a virtual ground at high frequencies. In the embodiment shown in FIG. 3, the third receiver capacitor $C_{3R}$ has a value of about 20 pF.

The second receiver resistor $R_{2R}$ and the receiver inductor $L_R$ are connected in series between the third receiver node $N_{3R}$ and the second receiver node $N_{2R}$. The second receiver resistor $R_{2R}$ has its value set to determine the gain of the receiver amplifier 160. The receiver inductor $L_R$ is used to enhance the bandwidth of the receiver amplifier 160. In alternate embodiments, the receiver inductor $L_R$ could be eliminated. In the embodiment shown in FIG. 3, the second receiver resistor $R_{2R}$ has a value of about 50 Ω and the receiver inductor $L_R$ has a value of about 5 nH.

In operation, negative feedback from the first receiver resistor $R_{1R}$ will tend to reduce the input impedance of the receiver amplifier 160 to 50 Ω. In the embodiment of FIG. 3, the value of the first receiver resistor $R_{1R}$ is chosen such that the input impedance of the receiver transistor $Q_R$ achieves a desired value, e.g., 50 ohms, when the receiver amplifier 160 is functioning.

In operation, a receiver input voltage $V_{R-IN}$ is provided at the receiver input node $N_{R-IN}$. This receiver input voltage $V_{R-IN}$ is then amplified by the receiver amplifier 160 according to generally understood amplifier principles to produce the receiver output voltage $V_{R-OUT}$, which is provided at the receiver output node $N_{R-OUT}$.

Although one embodiment is described above with reference to FIG. 3, and specific values are given for circuit elements, these are provided by way of example only and should not be considered in any way limiting. Alternate embodiments can modify the values of these elements as desired to alter the operation of the receiver amplifier 160.

Thus, as shown in FIGS. 1 to 3, the transmitter amplifier 140 is set to constantly generate an amplified transmitter output voltage $V_{T-OUT}$ that is provided to the T/R switch 120, and the receiver amplifier 160 is set to constantly amplify a receiver input voltage $V_{R-IN}$ received from the T/R switch 120. The transceiver 100 avoids the transmitter portion 130 interfering with the operation of the receiver portion 150 during a receive mode by disconnecting the transmitter portion 130 from the antenna 110 during the receive mode through use of the T/R switch 120. Similarly, the transceiver 100 avoids the receiver portion 150 interfering with the operation of the transmitter portion 130 during a transmit mode by disconnecting the receiver portion 150 from the antenna 110 during the transmit mode through use of the T/R switch 120.

However a switch, such as the T/R switch 120 of FIG. 1, can often be very lossy. As a result, transceivers that employ a T/R switch will lose some of their signal quality through the switch, limiting allowable losses in other parts of the transceiver. In addition, requiring a separate T/R switch can increase the cost of a resulting transceiver by requiring that an external switch be included. It would therefore be desireable to provide a way to isolate an antenna from a transmitter portion of a transceiver and a receiver portion of a transceiver in a way that did not involve the use of a T/R switch. Applicants provide an example of such a circuit below.

Second Transceiver

Figure 4:
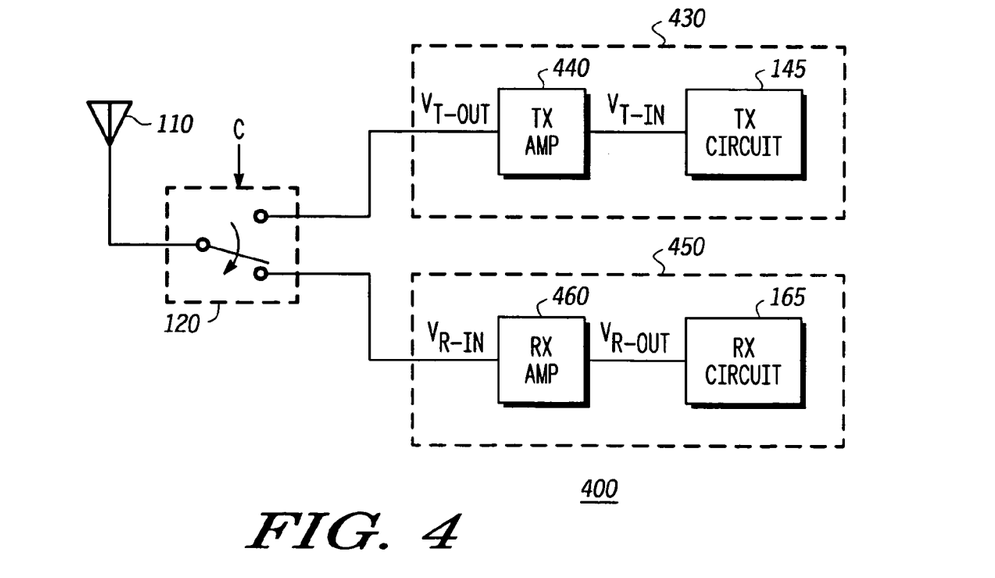
FIG. 4 is a diagram showing a transceiver device, according to one embodiment of the present invention.

FIG. 4 is a diagram showing an embodiment of a transceiver device, according to one embodiment of the present invention. As shown in FIG. 4, the transceiver device 400 includes an antenna 110, a transmitter portion 430, and a receiver portion 450. The transmitter portion 430 further includes a transmitter amplifier 440 and a transmitter circuit 145; and the receiver portion 450 further includes a receiver amplifier 460 and a receiver circuit 165.

The antenna 110 can be used to both transmit signals and receive signals. It can be any appropriate antenna that can serve this dual function. In the embodiment shown in FIGS. 4 to 6, a UWB antenna is used, such as the one disclosed in U.S. Pat. No. 6,590,545 to McCorkle, entitled "Electrically Small Planar UWB Antenna Apparatus and System Thereof." However, alternate embodiments can use different antenna designs.

The transmitter portion 430 in the embodiment of FIG. 4 includes all of the circuitry necessary to transmit signals according to a desired format. Its particular design can vary in different transceiver designs, as would be understood by one skilled in the art of receivers. In the embodiment shown in FIG. 4, the transmitter portion 430 is a UWB transmitter, though other transmitter designs can be used in alternate embodiments. As noted above, the transmitter portion 430 may include a transmitter amplifier 440 connected to the output of a transmitter circuit 145.

Similarly, the receiver portion 450 of the embodiment of FIG. 4 includes all of the circuitry necessary to receive signals according to a desired format. Its particular design can vary in different transceiver designs, as would be understood by one skilled in the art of transmitters. In the embodiment shown in FIG. 4, the receiver portion 450 is a UWB receiver, though other receiver designs can be used in alternate embodiments. As noted above, the receiver portion 450 of FIG. 4 includes a receiver amplifier 460 connected to the output of a receiver circuit 165. The receiver amplifier 460 may be a low noise amplifier (LNA).

Furthermore, although the transmitter portion 430 and the receiver portion 450 in FIG. 4 are shown as being directly connected to the antenna 110, other circuitry could be placed between the transmitter portion 430 or the receiver portion 450 and the antenna 110, e.g., a filter, as would be understood by those skilled in the art of transceivers.

Unlike the transceiver 100 shown in FIG. 1, the transceiver 400 shown in FIG. 4 does not contain a T/R switch. Rather, the transmitter amplifier 440 and the receiver amplifier 460 in FIG. 4 each contain circuitry that is configured to isolate the respective portion of the transceiver 400 when the other is being used. In other words, the transmitter amplifier 440 isolates the transmitter portion 430 from the antenna 110 during a receive mode, but allows normal operation between the transmitter portion 430 and the antenna 110 during a transmit mode. Similarly, the receiver amplifier 460 isolates the receiver circuit 165 from the antenna 110 during a transmit mode, but allows normal operation between the receiver portion 450 and the antenna 110 during a receive mode. And since these isolation operations are performed without the use of a T/R switch, the losses and additional production costs associated with such T/R switches can be avoided.

Second Transmitter Amplifier

Figure 5:
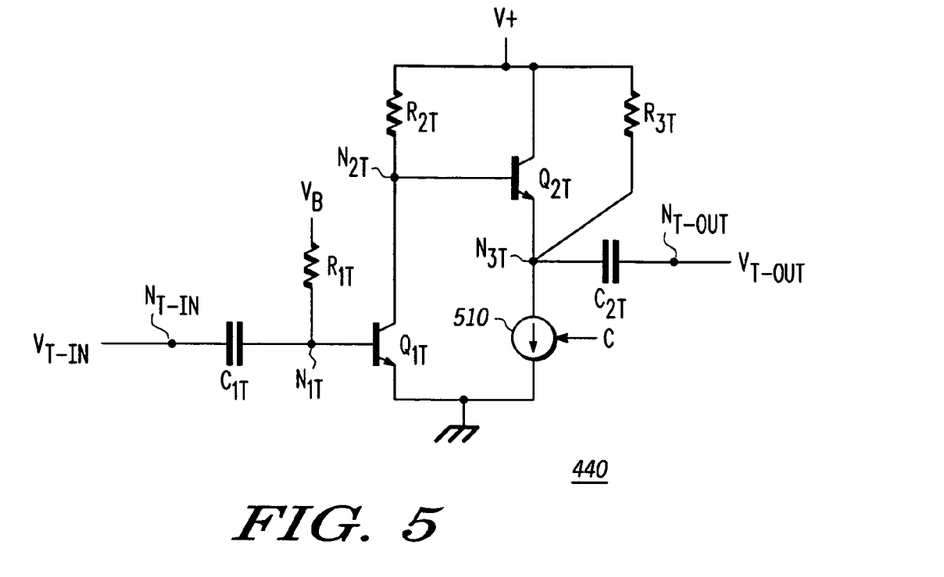
FIG. 5 is a circuit diagram of a transmitter amplifier from the transmitter portion of FIG. 4, according to one embodiment of the present invention.

FIG. 5 is a circuit diagram of a transmitter amplifier 440 from the transmitter portion of FIG. 4, according to one embodiment of the present invention. As shown in FIG. 4, the transmitter amplifier 440 includes a first transmitter transistor $Q_{1T}$, a second transmitter transistor $Q_{2T}$, a first transmitter capacitor $C_{1T}$, a second transmitter capacitor $C_{2T}$, a first transmitter resistor $R_{1T}$, a second transmitter resistor $R_{2T}$, a third transmitter resistor $R_{3T}$, and a transmitter current source 510.

The first transmitter transistor $Q_{1T}$ has its base connected to a first transmitter node $N_{1T}$, its collector connected to second transmitter node $N_{2T}$, and its emitter connected to ground. The first transmitter transistor $Q_{1T}$ is configured to operate as a driver amplifier in the transmitter amplifier 440.

The second transmitter transistor $Q_{2T}$ has its base connected to the second transmitter node $N_{2T}$, its collector connected to a reference voltage $V^+$, and its emitter connected to a third transmitter node $N_{3T}$. The second transmitter transistor $Q_{2T}$ is configured to operate as a driver in the transmitter amplifier 440. In the embodiment shown in FIG. 5, the reference voltage $V^+$ is about 3.3 volts.

The first transmitter capacitor $C_{1T}$ is connected between a transmitter input node $N_{T-IN}$ and the first transmitter node $N_{1T}$. It is configured to operate as an AC coupling capacitor, and serves to block any incoming DC voltages from the transmitter input node $N_{T-IN}$, so that all biases for the transmitter amplifier 440 are local biases. In the embodiment shown in FIG. 5, the first transmitter capacitor $C_{1T}$ has a value of about 500 $fF$.

The second transmitter capacitor $C_{2T}$ is connected between the third transmitter node $N_{3T}$ and the a transmitter output node $N_{T-OUT}$. It is configured to operate as an AC coupling capacitor, and serves to block any incoming DC voltages from the transmitter output node $N_{T-OUT}$, so that all biases for the transmitter amplifier 440 are local biases. In the embodiment shown in FIG. 5, the second transmitter capacitor $C_{2T}$ has a value of about 6 pF.

In alternate embodiments, the first and second transmitter capacitors $C_{1T}$ and $C_{2T}$ could be replaced with different circuit elements to isolate the bias voltages in the transmitter amplifier 440.

The first transmitter resistor $R_{1T}$ is connected between the bias voltage $V_B$ and the first transmitter node $N_{1T}$, and is configured to provide the bias voltage $V_B$ to the base of the first transmitter transistor $Q_{1T}$. This bias voltage $V_B$ of FIG. 5 is set to cause the first transmitter transistor $Q_{1T}$ to operate as desired to cause the transmitter amplifier 440 to perform its desired amplification function. In the embodiment shown in FIG. 5, the bias voltage $V_B$ is about 0.8 volts and the first transmitter resistor $R_{1T}$ has a value of about 1 k$\Omega$.

The second transmitter resistor $R_{2T}$ is connected between a reference voltage $V^+$ and the second transmitter node $N_{2T}$, and has its value set to determine the gain of the transmitter amplifier 440. In the embodiment shown in FIG. 5, the second transmitter resistor $R_{2T}$ has a value of about 250 $\Omega$.

The third transmitter resistor $R_{3T}$ is connected between a reference voltage $V^+$ and the third transmitter node $N_{3T}$, and has its value chosen to be significantly higher than the desired operational receiver input impedance of the receiver amplifier 160 during a receive mode. For example, in the embodiment shown in FIG. 6, the receiver amplifier is set to have an operational receiver input impedance of about 3 $\Omega$ during a receive mode, and the value of the third transmitter resistor $R_{3T}$ is set at about 50 k$\Omega$.

The transmitter current source 510 is connected between the third transmitter node $N_{3T}$ and ground, and in the embodiment of FIG. 5 is configured to provide a constant current across the second transmitter transistor $Q_{2T}$ during a transmit mode, but to shut off and provide no current across the second transmitter transistor $Q_{2T}$ during a receive mode. In the embodiment shown in FIG. 5, the transmitter current source 510 provides a current of about 20 mA.

The current source is controlled by a mode control signal C. In one embodiment the mode control signal is low during a transmit mode, and is high during a receive mode. When the mode control signal C indicates a transmit mode (i.e., it is low in the embodiment of FIGS. 4 to 6), the transmitter current source 510 is turned on; and when the mode control signal C indicates a receive mode (i.e., it is high in the embodiment of FIGS. 4 to 6), the transmitter current source 510 is turned off.

In the embodiment shown in FIG. 5, the transmitter current source 510 is a current mirror. The current mirror may be turned on and off in a variety of ways in response to the mode control signal C. But one way of accomplishing this is to have the mode control signal C control a switch (e.g., a CMOS switch) between ground and the common base of the transistors in the current mirror. When the mode control signal C indicates a receive mode (i.e., that the transmitter current source 510 should be turned off), switch is closed and the common base connected to ground to shut off the current mirror.

In some embodiments it may be desirable to place a pin diode between the third transmitter node $N_{3T}$ and the transmitter current source 510 or between the second transmitter capacitor $C_{2T}$ and the third transmitter node $N_{3T}$ (or the output node and the third transmitter node $N_{3T}$ in embodiments without the second transmitter capacitor $C_{2T}$). In particular, the addition of a pin diode is useful in embodiments in which a transistor collector is connected to the third transmitter node $N_{3T}$ (such as an embodiment in which the transmitter current source is a current mirror). The pin diode can serve to minimize stray capacitance between the collector connected to the third transmitter node $N_{3T}$ and the substrate.

In the embodiment of FIG. 5, the parameters of the circuitry in the transmitter amplifier 440 are chosen to provide a desired operational transmitter output impedance, e.g., 3 $\Omega$ during the transmit mode, and to provide a desired isolation transmitter output impedance, e.g., 50 k$\Omega$ during the receive mode.

Alternate embodiments could use different mode control signals. For example, an alternate mode control signal C could be low to indicate a receive mode and high to indicate a transmit mode. Also, multiple mode control signals could be used in place of a single mode control signal C to control operation of the various elements that operate differently is each mode.

The operation of the transmitter current source 510 and the third transmitter resistor $R_{3T}$ are configured to control the transmitter amplifier 440 to isolate the transmitter portion 430 from the antenna 10 when the mode control signal C indicates that the transceiver 400 is in a receive mode, but to allow normal operation between the transmitter portion 430 and the antenna 10 when the mode control signal C indicates that the transceiver 400 is in a transmit mode.

Figure 6:
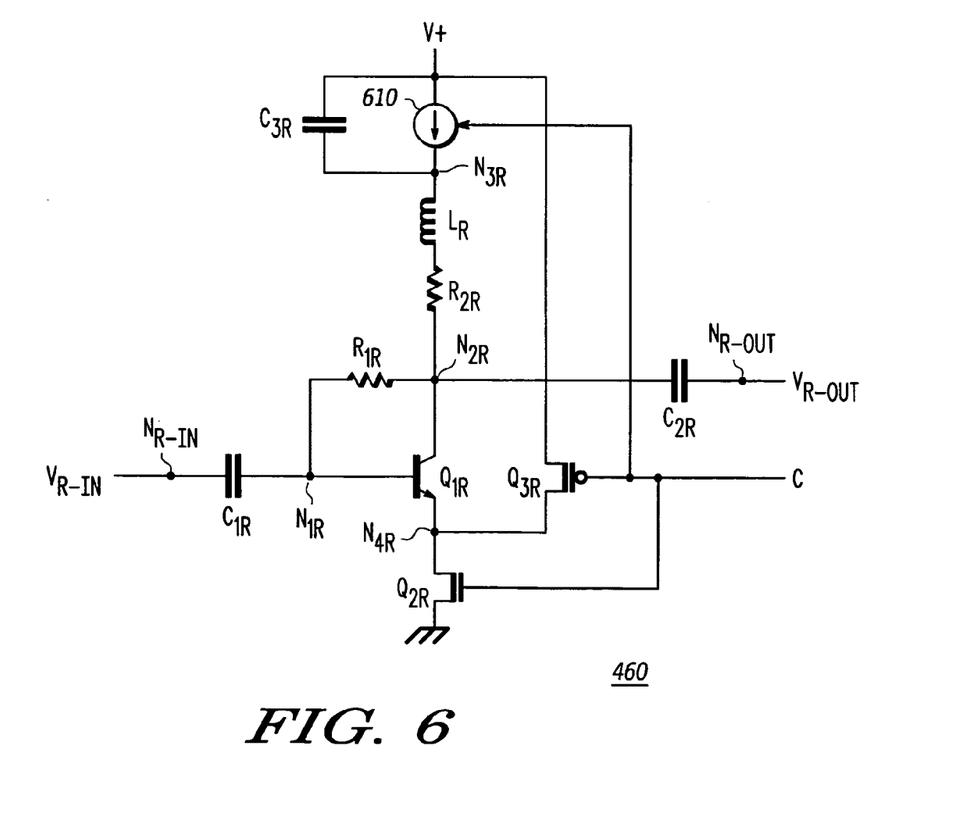
FIG. 6 is a circuit diagram of a receiver amplifier from the receiver portion of FIG. 4, according to one embodiment of the present invention.

During a transmit mode (i.e., when the mode control signal C is low in a the embodiment of FIGS. 4 to 6), the transmitter current source 510 will provide a reference current across the second transmitter transistor $Q_{2T}$ and the third transmitter resistor $R_{3T}$. This will cause the second transmitter transistor $Q_{2T}$ to turn on, will cause the circuitry in the transmitter amplifier 440 to operate as an amplifier, and will cause the output resistance of the transmitter amplifier to be the operational transmitter output impedance, i.e., 3 Ω in the embodiment of FIG. 5.

In this case, a transmitter input voltage $V_{T-IN}$ is provided at the transmitter input node $N_{T-IN}$. This transmitter input voltage $V_{T-IN}$ is then amplified by the transmitter amplifier 440 according to generally understood amplifier principles to produce the transmitter output voltage $V_{T-OUT}$, which is provided at the transmitter output node $N_{T-OUT}$. Because the value of the third transmitter resistor $R_{3T}$ is chosen to be so large, e.g., about 50 kΩ, it will draw a comparatively small current during the transmit mode, and will not significantly effect the operation of the transmitter amplifier 440. The voltage at the third transmitter node $N_{3T}$ will be determined primarily by the second transmitter resistor $R_{2T}$ and the second transmitter transistor $Q_{2T}$.

During a receive mode (i.e., when the mode control signal C is high in a the embodiment of FIGS. 4 to 6), the transmitter current source 510 will stop providing the reference current, and the second transmitter transistor $Q_{2T}$ will turn off. At this point the transmitter amplifier 440 will therefore stop acting as an amplifier.

Then the first transmitter resistor $R_{2T}$ will pull the voltage at the second node $N_{2T}$ UP to the reference voltage $V^+$, and the third transmitter resistor $R_{3T}$ will also pull the voltage at the third transmitter node $N_{3T}$ up to $V^+$. As a result, during the receive mode, the output impedance of the transmitter amplifier 440 will rise to the value of the third transmitter resistor $R_{3T}$ (i.e., to the isolation transmitter output impedance), which is chosen to be very large in comparison to the operational receiver input impedance of the receiver amplifier 460 during a receive mode (e.g., about 50 kΩ as compared to about 50 Ω in a the embodiment of FIG. 4 to 6).

In this way, the transmitter amplifier 440 has an operational transmitter output impedance, e.g., about 3 Ω, during the transmit mode and an isolation transmitter output impedance, e.g., about 50 kΩ, during the receive mode. This allows the transmitter amplifier 440 to transmit over the antenna 110 normally during the transmit mode, but be effectively isolated from the antenna 110 during a receive mode.

Although the disclosed embodiment shows that the isolation transmitter output impedance is set at about 50 kΩ and the operational transmitter output impedance is set at about 3 Ω, these values can be altered as needed. For example, in one set of alternate embodiments, the operational transmitter output impedance can be set between 1 Ω and 10 Ω.

However, the isolation transmitter output impedance of the transmitter amplifier 440 should remain sufficiently large as compared to the operational receiver input impedance of the receiver amplifier 460, such that interference from the transmitter portion 430 at the receiver portion 450 during a receive mode will be minimal.

In certain embodiments the isolation transmitter output impedance will be at least two orders of magnitude greater than the operational receiver input impedance. Thus, in the embodiment shown in FIG. 5, the isolation transmitter output impedance should be at least 5 kΩ. However, alternate embodiments with varying limitations on the transmitter operation could have a lower ratio of isolation transmitter output impedance to operational receiver input impedance if the values met system operation requirements.

Although the exemplary transmitter amplifier 440 shown in FIG. 4 uses a bipolar junction transistor as the first transmitter transistor $Q_{1T}$, and is set up in a common-emitter configuration, alternate embodiments could use other types of transistors for the amplifier circuit, e.g., a CMOS transistor.

Although a specific embodiment is described above with reference to FIG. 5, and specific values are given for circuit elements, these are provided by way of example only and should not be considered in any way limiting. Alternate embodiments can modify the values of these elements as desired to alter the operation of the transmitter amplifier 440.

Second Receiver Amplifier

FIG. 6 is a circuit diagram of a receiver amplifier 460 from the receiver portion 450 of FIG. 4, according to one embodiment of the present invention. As shown in FIG. 6, the receiver amplifier 460 includes a receiver current source 610, a first receiver transistor $Q_{1R}$, a second receiver transistor $Q_{2R}$, a third receiver transistor $Q_{3R}$, a first receiver capacitor $C_{1R}$, a second receiver capacitor $C_{2R}$, a third receiver capacitor $C_{3R}$, a first receiver resistor $R_{1R}$, a second receiver resistor $R_{2R}$, and a receiver inductor $L_R$.

The first receiver transistor $Q_{1R}$ in the embodiment of FIG. 6 is a bipolar transistor that has its base connected to a first receiver node $N_{1R}$, its collector connected to a second receiver node $N_{2R}$, and its emitter connected to a fourth receiver node $N_{4R}$.

The second receiver transistor $Q_{2R}$ in the embodiment of FIG. 6 is a CMOS transistor that has its gate connected to a mode control signal C, its source connected to ground, and its drain connected to the fourth receiver node $N_{4R}$. The second receiver transistor $Q_{2R}$ operates as a switch, being closed (i.e., conductive) when the mode control signal C indicates a receive mode, and being open (i.e., non-conductive) when the mode control signal C indicates a transmit mode.

Since in the disclosed embodiment the mode control signal C is high during a receive mode and low during a transmit mode, this means that the second receiver transistor $Q_{2R}$ in the embodiment of FIG. 6 is an NMOS transistor, which will be conductive when the signal at its base is high (during a receive mode) and will be non-conductive when the signal at its base is low (during a transmit mode).

The third receiver transistor $Q_{3R}$ in the embodiment of FIG. 6 is a CMOS transistor that has its gate connected to a mode control signal C, its source connected to the reference voltage $V^+$, and its drain connected to the fourth transmitter node $N_{4T}$. The third receiver transistor $Q_{3R}$ operates as a switch, being open (i.e., non-conductive) when the mode control signal C indicates a receive mode, and being closed (i.e., conductive) when the mode control signal C indicates a transmit mode.

Since in the disclosed embodiment the mode control signal C is high during a receive mode and low during a transmit mode, this means that the third receiver transistor $Q_{3R}$ in the embodiment of FIG. 6 is a PMOS transistor, which will be non-conductive when the signal at its base is high (during a receive mode) and will be conductive when the signal at its base is low (during a transmit mode).

Although in the disclosed embodiment the second receiver transistor $Q_{2R}$ is an NMOS transistor and the third receiver transistor $Q_{3R}$ is a PMOS transistor, these could be changed in alternate embodiments. For example, if the polarity of the mode control signal C were changed (i.e., so that it was low during a receive mode and high during a transmit mode), the second receiver transistor $Q_{2R}$ could be a PMOS transistor and the third receiver transistor $Q_{3R}$ could be an NMOS transistor. Also, both could be made into PMOS or NMOS, so long as one received an inverse signal from the other. It is important, however, that during a receive mode, the fourth receiver node $N_{4R}$ be connected to ground, and during a transmit mode the fourth receiver node $N_{4R}$ be connected to the reference voltage $V^+$.

In alternate embodiments other types of switching devices can be used in place of the second and third receiver transistors $Q_{2R}$ and $Q_{3R}$, as would be understood by one skilled in the art. For example, the second receiver transistor $Q_{2R}$ could be a bipolar transistor, making it a bipolar switch.

The first receiver capacitor $C_{1R}$ is connected between a receiver input node $N_{R-IN}$ and the first receiver node $N_{1R}$, and serves to block any incoming DC voltages from the receiver input node $N_{R-IN}$, so that all biases for the receiver transistor $Q_R$ are local biases. In the embodiment shown in FIG. 6, the first receiver capacitor $C_{1R}$ has a value of 6 pF.

The second receiver capacitor $C_{2R}$ is connected between a receiver output node $N_{R-OUT}$ and the second receiver node $N_{2R}$, and serves to block any incoming DC voltages from the receiver output node $N_{R-OUT}$, so that all biases for the receiver transistor $Q_R$ are local biases. In the embodiment shown in FIG. 6, the second receiver capacitor $C_{2R}$ has a value of 6 pF.

In alternate embodiments, the first and second receiver capacitors $C_{1R}$ and $C_{2R}$ could be replaced with different circuit elements to isolate the bias voltages in the receiver amplifier 460.

The first receiver resistor $R_{1R}$ is connected between the first receiver node $N_{1R}$ and the second receiver node $N_{2R}$, and is configured to provide a feedback signal to bias the base of the first receiver transistor $Q_{1R}$. In the embodiment shown in FIG. 6, the first receiver resistor $R_{1R}$ has a value of 800 Ω.

The receiver current source 610 is connected between a reference voltage $V^+$ and a third receiver node $N_{3R}$. It is configured to provide a reference current for the first receiver transistor $Q_{1R}$ when the mode control signal C indicates a receive mode, and to be shut off when the mode control signal C indicates a transmit mode. In the embodiment shown in FIG. 6, the receiver current source 610 provides a current of 12 mA.

The third receiver capacitor $C_{3R}$ is connected between the reference voltage $V^+$ and the third receiver node $N_{3R}$ in parallel with the receiver current source 610. It is configured to separate the reference voltage $V^+$ from the third receiver node $N_{3R}$, which forms a virtual ground at high frequencies.

In the embodiment shown in FIG. 6, the third receiver capacitor $C_{3R}$ has a value of 20 pF.

The second receiver resistor $R_{2R}$ and the receiver inductor $L_R$, are connected in series between the third receiver node $N_{3R}$ and the second receiver node $N_{2R}$. The second receiver resistor $R_{2R}$ has its value set to determine the gain of the receiver amplifier 460. The receiver inductor $L_R$ is used to enhance the bandwidth of the receiver amplifier 460. In alternate embodiments, the receiver inductor $L_R$ could be eliminated. In the embodiment shown in FIG. 6, the second receiver resistor $R_{2R}$ has a value of 50 Ω and the receiver inductor $L_R$ has a value of 5 nH.

In the embodiment of FIG. 6, the parameters of the circuitry in receiver amplifier 460 are chosen to provide a desired operational input impedance, e.g., 50 Ω during the receive mode, and a desired isolation input impedance, e.g., approaching the impedance of an open circuit, during the transmit mode.

Alternate embodiments could use different mode control signals. For example, an alternate mode control signal C could be low to indicate a receive mode and high to indicate a transmit mode. Also, multiple mode control signals could be used in place of a single mode control signal C to control operation of the various elements that operate differently is each mode.

In operation, negative feedback from the first receiver resistor $R_{1R}$ will tend to decrease the input impedance of the receiver amplifier 460. In the embodiment of FIG. 6, the value of the first receiver resistor $R_{1R}$ is chosen such that the operational input impedance of the first receiver transistor $Q_{1R}$ achieves a desired value, e.g., about 50 ohms, when the first receiver transistor $Q_{1R}$ is on.

During a receive mode (i.e., when the mode control signal C is high in the embodiment of FIGS. 4 to 6), the receiver current source 610 will generate a reference current, the second receiver transistor $Q_{2R}$ will be conductive, and the third receiver transistor $Q_{3R}$ will be non-conductive. This will connect the fourth receiver node $N_{4R}$ to ground and will pass the reference current across the first receiver transistor $Q_{1R}$, which will turn on the first receiver transistor $Q_{1R}$ and cause the circuitry in the receiver amplifier 460 to operate as an amplifier.

In this case, a receiver input voltage $V_{R-IN}$ is provided at the receiver input node $N_{R-IN}$. This receiver input voltage $V_{R-IN}$ is then amplified by the receiver amplifier 460 according to generally understood amplifier principles to produce the receiver output voltage $V_{R-OUT}$, which is provided at the receiver output node $N_{R-OUT}$.

During a transmit mode (i.e., when the mode control signal C is low in the embodiment of FIGS. 4 to 6), the receiver current source 610 will be shut off, the second receiver transistor $Q_{2R}$ will be non-conductive, and the third receiver transistor $Q_{3R}$ will be conductive. This will connect the fourth receiver node $N_{4R}$ to the reference voltage $V^+$ and will result in no current passing through the first receiver transistor $Q_{1R}$. As a result, first receiver transistor $Q_{1R}$ will be back biased and turned off, causing the receiver amplifier 460 to be shut off and have an extremely high input impedance, approaching that of an open circuit.

By employing a transmitter amplifier 440 that has an operational transmitter output impedance during a transmit mode, but has a comparatively high isolation transmitter output impedance during a receive mode, the transceiver 100 allows the transmitter portion 430 to function properly during the transmit mode, but not interfere with the receiver portion 450 during a receive mode. Similarly, by employing a receiver amplifier 460 that has an operational receiver output impedance during a receive mode, but has a comparatively high isolation receiver output impedance during a transmit mode, the transceiver 100 allows the receiver portion 450 to function properly during the receive mode, but not interfere with the transmitter portion 430 during a transmit mode.

Furthermore, by using the second and third receiver transistors $Q_{2R}$ and $Q_{3R}$ to connect the fourth receiver node $N_{4R}$ to ground and the reference voltage $V^+$, respectively, the receiver amplifier 460 of FIG. 6 can quickly switch from its operational receiver input impedance to its isolation receiver input impedance and vice versa. The emitter of the first receiver transistor $Q_{1R}$ is quickly moved between ground and the reference voltage as the mode changes.

Although the disclosed embodiment shows that the isolation receiver input impedance is set to approach an open circuit and the operational receiver input impedance is set at about 50 Ω, these values can be altered as needed. For example, in one set of embodiments, the operational receiver input impedance can be set between 30 Ω and 75 Ω.

However, the isolation receiver input impedance of the receiver amplifier 460 should remain sufficiently large as compared to the operational transmitter output impedance of the transmitter amplifier 440, such that interference from the receiver portion 450 at the transmitter portion 430 during a transmit mode will be minimal.

In certain embodiments, the isolation receiver input impedance will be at least two orders of magnitude greater than the operational transmitter output impedance. Thus, in the embodiment shown in FIG. 6, the isolation output impedance should be at least 300 Ω. However, alternate embodiments with varying limitations on the transmitter operation could have a lower ratio of isolation receiver input impedance to operational transmitter output impedance if the values met system operation requirements.

Although one embodiment is described above with reference to FIG. 6, and specific values are given for circuit elements, these are provided by way of example only and should not be considered in any way limiting. Alternate embodiments can modify the values of these elements as desired to alter the operation of the receiver amplifier 460.

Although the disclosure shows by way of example a circuit and method for connecting a transmitter circuit and a receiver circuit to a common antenna, the system and method described above is applicable to any situation in which two separate circuit elements share a common signal path. This could be, for example, an input line, an output line, a data bus, or an element internal to a device or integrated circuit. This disclosure should not be considered limited to transceivers and switching between a transmitter and a receiver.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A transceiver for use in a wireless device, comprising:
    a transmitter circuit configured to generate a wireless signal for transmission;
    a transmitter amplifier connected between the antenna and the transmitter circuit, the transmitter amplifier configured to have an operational transmitter output impedance when the transceiver is in a transmit mode and an isolation transmitter output impedance when, the transceiver is in a receive mode;
    a receiver circuit configured to receive and process a wireless signal received at the antenna;
    a receiver amplifier connected between the antenna and the receiver circuit, the receiver amplifier configured to have an operational receiver input impedance when the transceiver is in a receive mode and an isolation receiver input impedance when the transceiver is in a transmit mode,
    wherein the isolation transmitter output impedance is greater than the operational receiver input impedance, and
    wherein the isolation receiver input impedance is greater than the operational transmitter output impedance.

2. A transceiver for use in a wireless device, as recited in claim 1, wherein the isolation transmitter output impedance is at least one hundred times the operational receiver input impedance.

3. A transceiver for use in a wireless device, as recited in claim 1, wherein the operational receiver input impedance is between 30 ohms and 75 ohms.

4. A transceiver for use in a wireless device, as recited in claim 1, wherein the isolation receiver input impedance is at least one hundred times the operational transmitter output impedance.

5. A transceiver for use in a wireless device, as recited in claim 1, wherein the operational transmitter output impedance is between 1 ohm and 10 ohms.

6. A transceiver for use in a wireless device, as recited in claim 1, wherein the receiver amplifier further comprises:
    a first transistor having a control terminal connected to a first node, a first terminal connected to a second node, and a second terminal connected to a third node;
    a current source for providing a reference current to the first transistor;
    a first resistor connected between the second node and the first node for providing a bias voltage to the control terminal;
    a second resistor connected between the second node and a first reference voltage;
    a first switch connected between the third node and ground; and
    a second switch connected between the third node and a second reference voltage,
    wherein the current source is turned on when a control signal has a first value and is turned off when the control signal has a second value,
    wherein the first switch is closed when the control signal has the first value and is open when the control signal has the second value, and
    wherein the second switch is open when the control signal has the first value and is closed when the control signal has the second value.

7. A transceiver for use in a wireless device, as recited in claim 6, wherein the first and the second reference voltages are the same.

8. A transceiver for use in a wireless device, as recited in claim 6, further comprising:
- a first capacitor between the first node and an input node; and
- a second capacitor between the second node and an output node.

9. A transceiver for use in a wireless device, as recited in claim 6,
wherein the first switch comprises a second transistor, and wherein the second switch comprises a third transistor.

10. A transceiver for use in a wireless device, as recited in claim 6, further comprising an inductor connected in series with the second resistor between the second node and the reference current.

11. A transceiver for use in a wireless device, as recited in claim 1, wherein the transmitter amplifier further comprises:
- a driver transistor having a driver control terminal connected to a first node, a first driver terminal connected to a second node, and a second driver terminal connected to ground;
- an amplifier transistor having an amplifier control terminal connected to the second node, a first amplifier terminal connected to a first reference voltage, and a second amplifier terminal connected to a third node;
- a first resistor connected between a bias voltage and the first node;
- a second resistor connected between the second node and a third reference voltage;
- a third resistor connected between the third node and a third reference voltage, the third resistor having a value greater than 1000 ohms; and
- a current source for providing a reference current to the second transistor, wherein the current source is turned on when a control signal has a first value and is turned off when the control signal has a second value.

12. A transceiver for use in a wireless device, as recited in claim 11, further comprising:
- a first capacitor between the first node and an input node; and
- a second capacitor between the second node and an output node.

13. A transceiver for use in a wireless device, as recited in claim 1, wherein the wireless device is an ultrawide bandwidth device.

14. A method of operating a transceiver having a transmitter portion and a receiver portion, the method comprising:
- receiving a signal indicating whether the transceiver is in a transmit mode or a receive mode;
- setting an actual receiver input impedance for the receiver portion to an operational receiver input impedance if the transceiver is determined to be in the receive mode;
- setting an actual transmitter output impedance for the transmitter portion to an isolation transmitter output impedance if the transceiver is determined to be in the receive mode;
- setting an actual receiver input impedance for the receiver portion to an isolation receiver input impedance if the transceiver is determined to be in a transmit mode; and
- setting an actual transmitter output impedance for the transmitter portion to an operational transmitter output impedance if the transceiver is determined to be in the transmit mode,
wherein the isolation receiver input impedance is greater than the operational transmitter output impedance, and
wherein the isolation transmitter output impedance is greater than the operational receiver input impedance.

15. A method of operating a transceiver, as recited in claim 14, wherein the step of determining whether the transceiver is in a transmit mode or a receive mode is performed by examining a value of a mode control signal.

* * * * *

UNITED STATES PATENT AND TRADEMARK OFFICE
CERTIFICATE OF CORRECTION

PATENT NO. : 7,324,790 B2  
APPLICATION NO. : 10/834024  
DATED : April 29, 2004  
INVENTOR(S) : Phuong T. Huynh

It is certified that error appears in the above-identified patent and that said Letters Patent is hereby corrected as shown below:

In Column 14, Line 13, Claim No. 1:

Change "isolation transmitter output impedance when, the" to --isolation transmitter output impedance when the--

Signed and Sealed this

Twenty-ninth Day of July, 2008

JON W. DUDAS  
*Director of the United States Patent and Trademark Office*

UNITED STATES PATENT AND TRADEMARK OFFICE
CERTIFICATE OF CORRECTION

PATENT NO. : 7,324,790 B2  Page 1 of 1
APPLICATION NO. : 10/834024
DATED : January 29, 2008
INVENTOR(S) : Phuong T. Huynh It is certified that error appears in the above-identified patent and that said Letters Patent is hereby corrected as shown below:

In Column 14, Line 13, Claim No. 1:

Change "isolation transmitter output impedance when, the" to --isolation transmitter output impedance when the--

This certificate supersedes the Certificate of Correction issued July 29, 2008.

Signed and Sealed this

Twenty-sixth Day of August, 2008

JON W. DUDAS
*Director of the United States Patent and Trademark Office*